United States Patent [19]

Danler et al.

[11] 4,284,370

[45] Aug. 18, 1981

[54] AIR CONVEYOR FOR BOTTLES AND BOTTLE PREFORMS

[76] Inventors: Richard W. Danler, 1235 Buchanan Dr., Santa Clara, Calif. 95051; William L. Bilobran, 763 Lakebird Dr., Sunnyvale, Calif. 94086

[21] Appl. No.: 92,316

[22] Filed: Nov. 8, 1979

Related U.S. Application Data

[63] Continuation of Ser. No. 961,380, Nov. 16, 1978, abandoned.

[51] Int. Cl.³ .............................................. B65G 51/02
[52] U.S. Cl. ..................................................... 406/86
[58] Field of Search ................................... 406/86, 88

[56] References Cited

U.S. PATENT DOCUMENTS

| 662,574 | 11/1900 | McGary | 406/88 |
|---|---|---|---|
| 3,734,567 | 5/1973 | Fong | 406/86 |
| 3,850,478 | 11/1974 | Hurd | 406/88 X |
| 3,953,076 | 4/1976 | Hurd | 406/88 |

FOREIGN PATENT DOCUMENTS 2509469  9/1976  Fed. Rep. of Germany ............. 406/86

Primary Examiner—James L. Rowland
Attorney, Agent, or Firm—Patrick J. Walsh

[57] ABSTRACT

An air conveyor for bottles and bottle preforms wherein bottles are preferably conveyed while supported from a neck ring intermediate neck and body portions of the bottle by air jets directed at the neck portion of the bottle from a plenum chamber defining a conveying path. The conveyor includes depending side curtains in close proximity to the sides of the bottles as an aid to conveyance. As a further aid to conveyance through inclined portions of the conveying path, the conveyor is provided with bottom plate joining the bottom edges of the side curtains.

5 Claims, 8 Drawing Figures

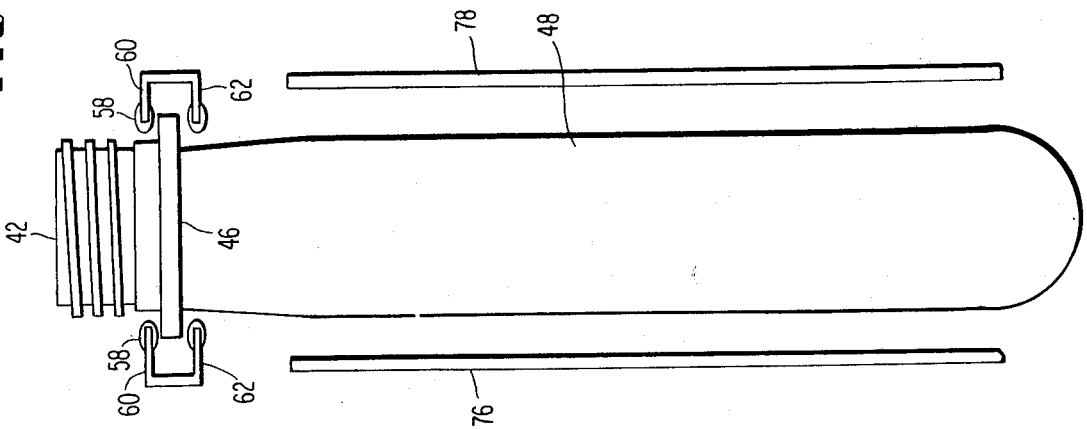
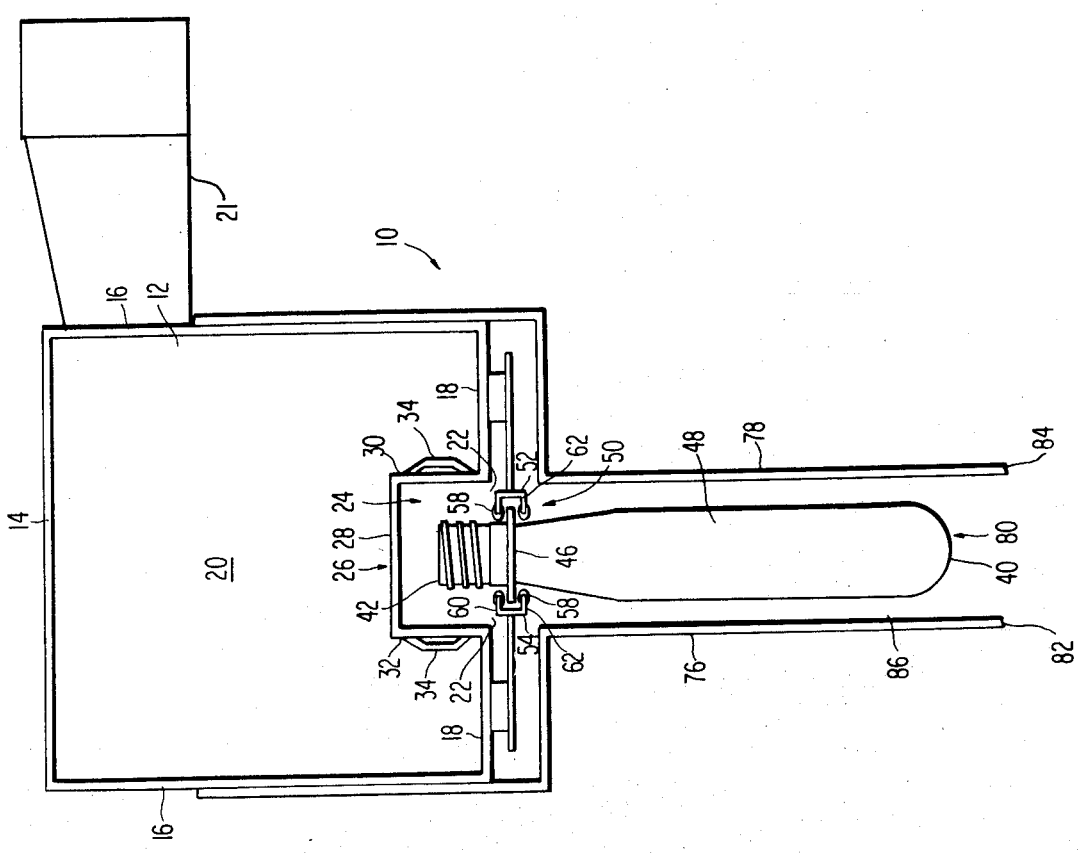

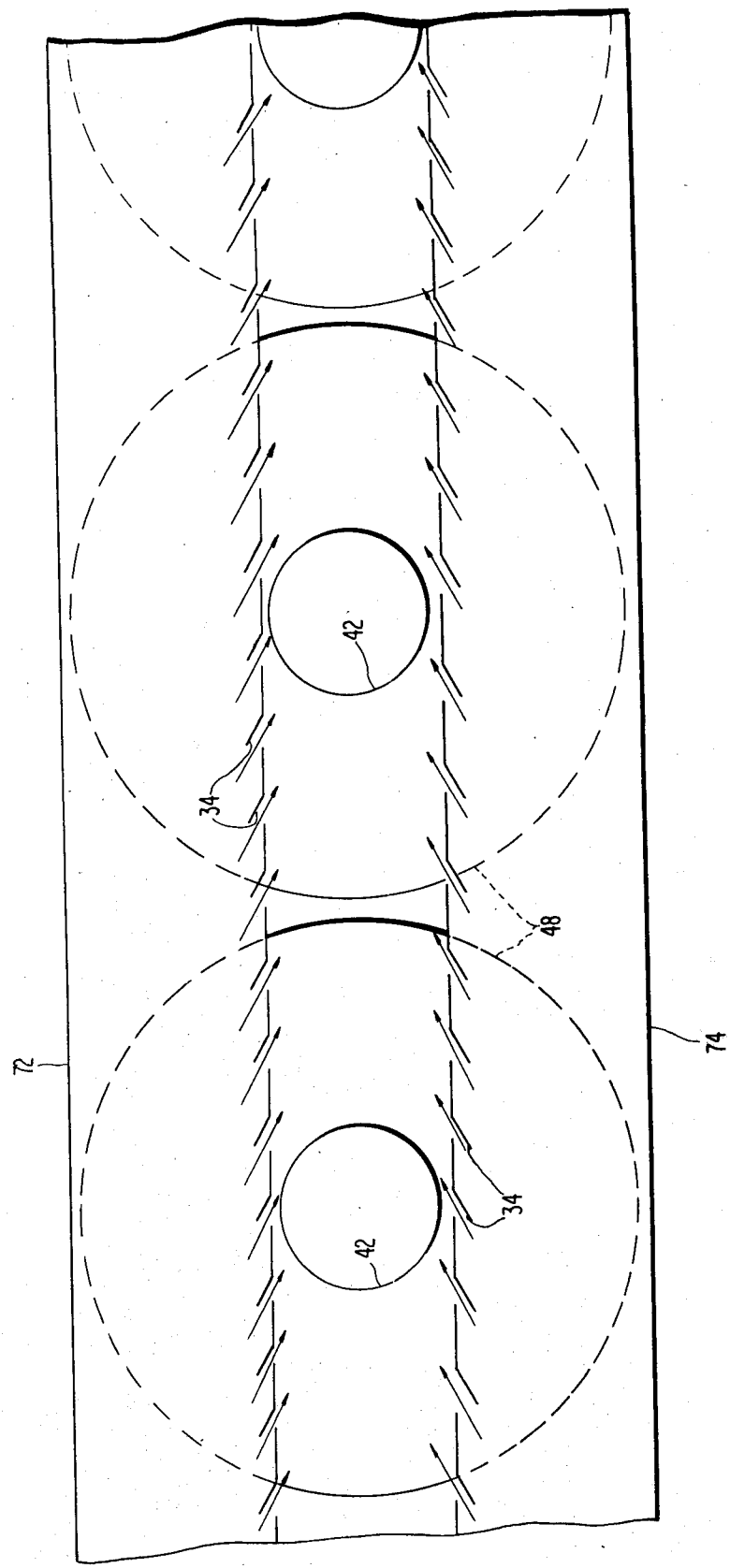

AIR CONVEYOR FOR BOTTLES AND BOTTLE PREFORMS

This is a continuation of application Ser. No. 961,380, filed Nov. 16, 1978, now abandoned.

BACKGROUND OF THE INVENTION

Blown bottles especially blown plastic bottles are now commonly used for packaging a variety of consumer products including soft drink beverages. In the fabrication of blown plastic bottles, a bottle preform is fabricated and subsequently blown into a full-size bottle. Both the bottle preform and the bottle itself have rounded bottoms and are not easily conveyed in an upright manner by conventional handling equipment. Nevertheless, upright conveying is highly desirable for convenient interfacing with other machines at each end of the conveying section involved in the bottle/preform fabrication. And so belt conveyors, bulk conveyors, or side conveyors for bottles and preforms are not satisfactory. Moreover, the plastic bottle or preform is easily scratched during handling and accordingly existing conveyors are additionally unsuitable for handling the bottles and preforms. Bulk and side conveying of the preforms and bottles causes unacceptable damage to their threads and sealing surfaces.

SUMMARY OF THE INVENTION

An air conveyor according to this invention provides for conveying bottles and preforms and is especially suited for conveying plastic bottles and preforms. According to the invention the bottles and preforms are suspended by their necks from suitable guide rails and are moved along the guide rails by overhead air jets developed by the air conveyor. The conveyor further includes depending side wall or curtain members extending along each side of the conveyed bottles or preforms. The depending side wall members confine movement of the bottles and preforms to the path of conveyance. The depending side curtains define an air channel through which residual conveying air passes as it exhausts from the air conveyor. The air channel thereby momentarily confines each quantum of residual conveying air so that while the conveyor is in operation the residual conveying air in the air channel defined by the side curtains aids in conveying the bottles and preforms. It is possible therefore to operate the conveyor more efficiently at lower air pressures in the conveying air not only for conveying horizontally but also for conveying from lower to higher elevations. In addition the residual air in the air channel enables accumulation recovery, that is, bottles or preforms accumulated at rest within the air conveyor readily resume movement in the conveying direction under the influence of the direct air conveying jets and the residual air within the channel.

OBJECTS OF THE INVENTION

It is an object of the invention to provide an air conveyor for bottles and bottle preforms.

Another object of the invention is to convey bottles and preforms having rounded bottoms in a vertically upright orientation.

Another object of the invention is to provide an efficient air conveyor capable of resuming conveying movement from a rest position of an accumulation of bottles or preforms.

Another object of the invention is to provide an air conveyor for plastic bottles and bottle preforms which minimizes scratching marring or other injury to the bottles or preforms during conveyance.

Other and further objects of the invention will be apparent upon an understanding of the following detailed description of the invention or will occur to one skilled in the art upon employment of the invention in practice.

A preferred embodiment of the invention has been chosen for purposes of illustration and description and is shown in the accompanying drawing wherein:

FIG. 1 is a section view of an air conveyor for bottle preforms according to the present invention.

FIG. 2 is a detail view of the air conveyor of FIG. 1.

FIG. 8 is a schematic plan view showing an air conveyor according to the present invention for conveying bottles.

Figure 5:
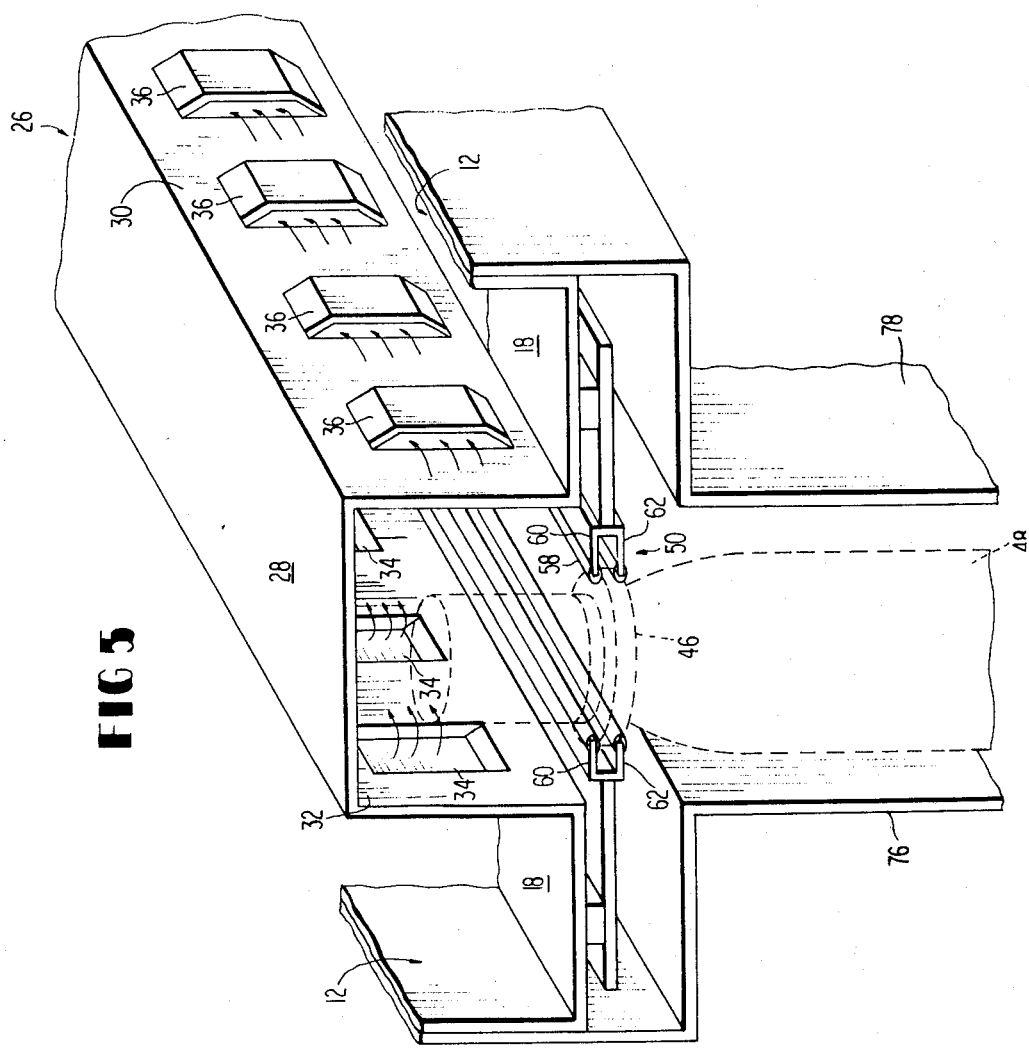
FIG. 5 is a fragmentary perspective view illustrating the air conveyor of FIG. 1.
Figure 3:
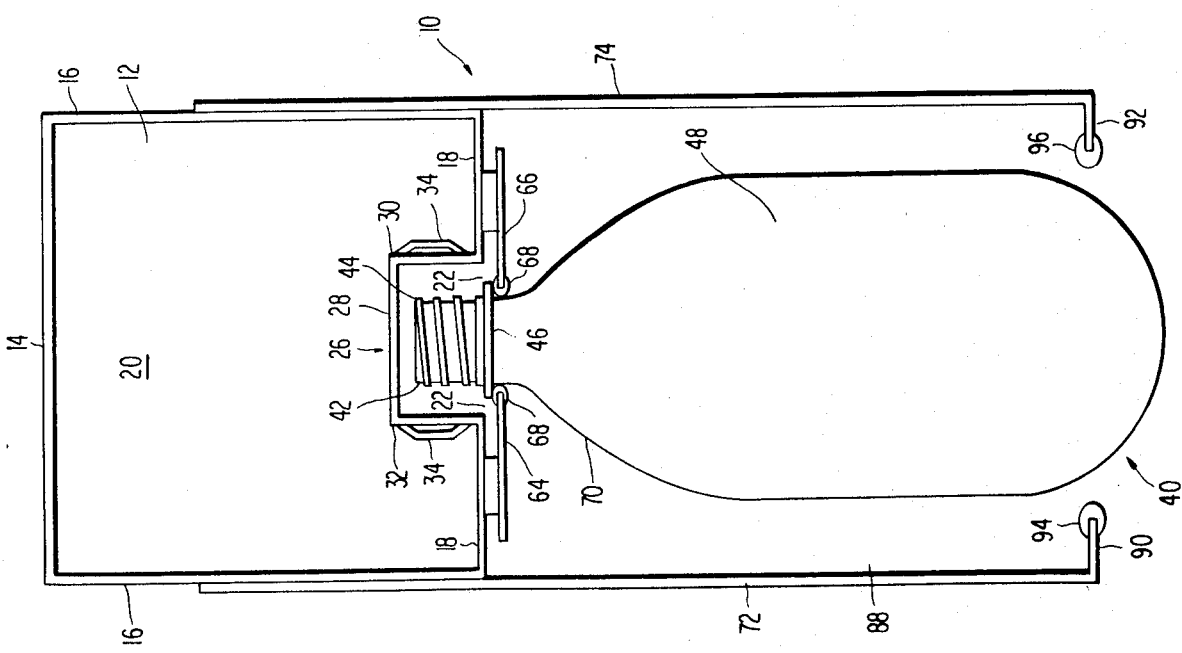
FIG. 3 is a section view of an air conveyor for bottles according to the present invention.

Referring now to the drawing and in particular to FIGS. 1 and 3, an air conveyor 10 according to the invention comprises an enclosed, elongated plenum chamber 12 defined by elongated top 14, side 16, and bottom 18 walls and by end walls 20. The air plenum chamber receives pressurized air through an air supply fan (not shown) at a typical pressure of five inches water guage. The bottom wall 18 of the plenum chamber contains an elongated gap or slot 22 extending the length of the air conveyor and which coincides with conveying path 24. The elongated slot 22 is covered throughout its length by an inverted U-shaped air conveying channel member 26 defined by a top wall 28 and side walls 30, 32 adjoined by suitable means to the spaced edges of the bottom side wall slot 22. As shown best in FIG. 5, each of the conveying channel side walls 30, 32 is incised with a plurality of slots 34 vertically oriented and lying in a row along the length of the air channel side walls. The air slots are formed in a conventional manner by incising the channel side walls and by depressing the downstream portion 36 of the side wall into the plenum chamber 12 thereby creating each slot. When the plenum chamber 12 receives pressurized air, air jets indicated by arrows in FIG. 5 flow through the slots 34. Each air jet has a substantial flow component along the inner surface of the channel sidewalls 30, 32. Collectively, the air jets issuing into the conveying channel create a stream of conveying air effective to move bottles or bottle preforms by impinging on their neck portions.

As shown in FIGS. 1 and 3, each bottle and bottle preform 40 includes a neck 42 with closure cap engaging threads 44, a neckring 46, and a body portion 48. The preform is axially symetrical and basically cylindrical in shape. The bottle shown in FIG. 3 has been formed from a preform of the kind shown in FIG. 1 by blowing the body portion thereof to the size and form of FIG. 3. In final form each bottle is axially symetrical and essentially cylindrical with a rounded bottom.

As shown in FIGS. 1 and 2, the air conveyor for preforms includes a channel guide member 50 defined by confronting U-shaped members 52, 54 for receiving the neckring 46 portion of each preform. The edges of each U-shaped member 52, 54 are fitted with protective strips 58 extending the length of the channel guides for minimizing friction with and abrasion of the bottle preforms. The channel guide 50 enables conveyance of the preforms in an upright manner so that the air conveyor can interface with other preform forming/handling machines for continuous movement of preforms in an upright manner. This upright conveyance is accomplished without damage to the bottle neck thread 44, sealing surface 47, or to the body 48.

While at rest the bottle preforms 40 will hang vertically from their neckring engagement with the channel guide 50. However, while being conveyed the preforms tend to swing in a vertical plane lying in the direction of conveyance. The upper and lower rails 60, 62 of the channel guides are spaced to limit swinging movement of the neckring and of the preforms. The channel guides prevent fore and aft as well as side-to-side swinging movement of the preforms.

Figure 4:
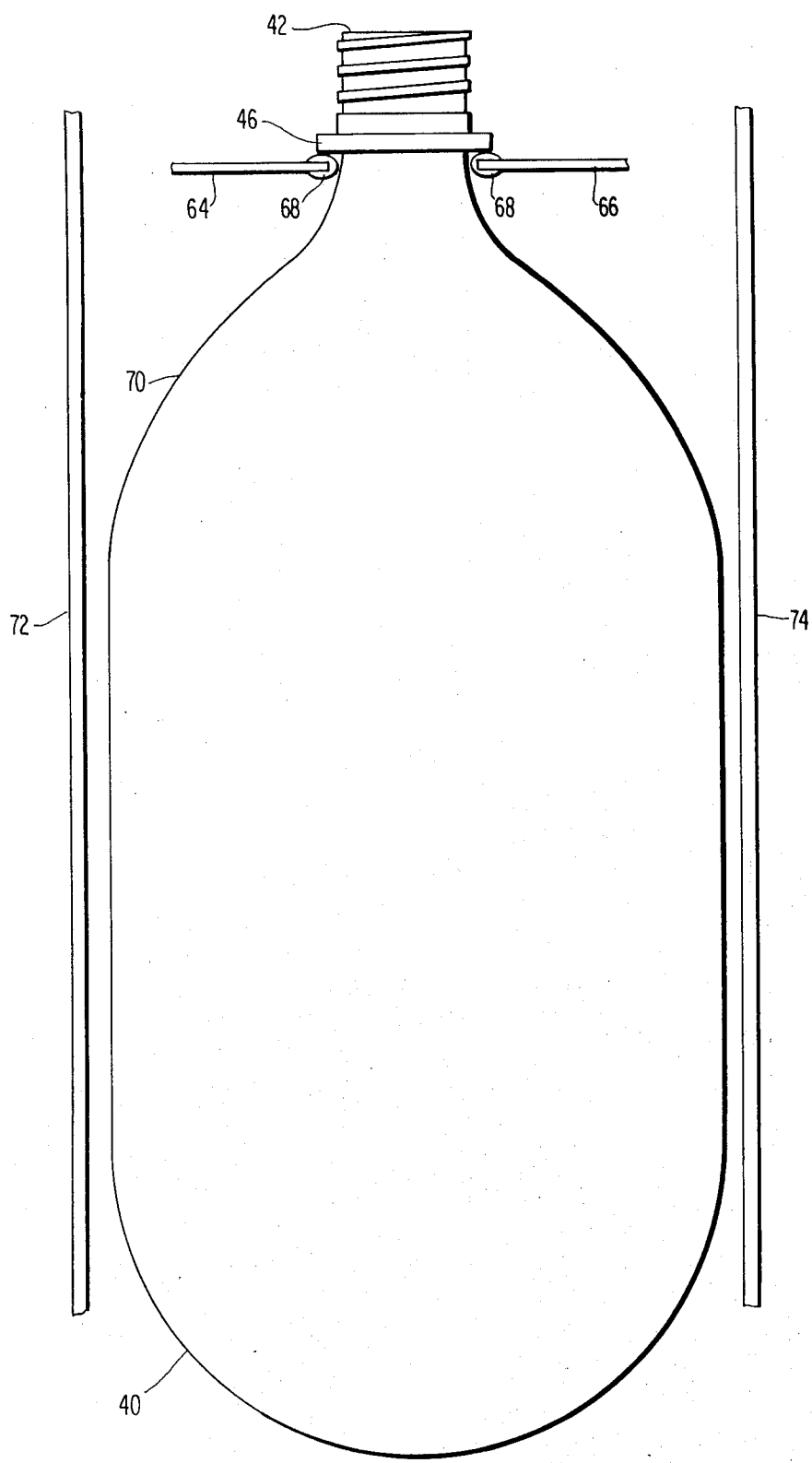
FIG. 4 is a detail view of the air conveyor of FIG. 3.

As shown in FIGS. 3 and 4, the air conveyor for bottles 40 includes a pair of spaced guide rails 64, 66 for engaging and guiding each bottle under the neckring. The guide rails have protective strips 68 of low friction, non-abrasive material for minimizing frictional contact and abrasion between guide rails and bottle. The shoulder portion 70 of each bottle flares outwardly beyond the neckring and cooperates with the guide rails 64, 66 to minimize fore and aft swinging of the bottles as they are conveyed. With bottles it is important to avoid side-to-side swinging and side walls or side curtains are used for this purpose as more fully explained below.

As shown in FIGS. 1–4, each form of air conveyor has side curtains 72, 74, 76, 78 extending the entire length of the air conveyor. The side curtains 76, 78 for the preform air conveyor are spaced inwardly from the plenum side walls so to be in close proximity to the bottle preforms. The side curtains are substantially impervious to the passage of air therethrough. Pressurized conveying air however does exhaust through the elongated opening 80 defined by the terminal edges 82, 84 of the side curtains 76, 78. The confronting side curtains 76, 78 define a conveying channel 86 in which residual pressurized air engages the body portion 48 of the preform as an aid to moving the preforms in the conveying direction. As will be explained more fully below, the residual pressurized air in the conveying channel 86 is particularly useful in enabling accumulation recovery of a line of preforms at rest in the conveyor. In additon, the side curtains allow use of lower plenum air pressures to accomplish conveyance of both preforms and bottles.

For conveying bottles the side curtains 72, 74 (FIG. 3) extend downwardly substantially in line with the sidewalls of the plenum and define an air channel 88 in which residual conveying air aids in conveying the bottles. The terminal edges of the side curtains are turned inwardly to define lower guide rails 90, 92 which are covered with protective strips 94, 96 for guiding the lower portion of the bottles during conveyance. Lower guide rails 90, 92 prevent side-to-side swinging movement of the bottles as they are being conveyed. This prevents jamming of the bottles as a result of sideways cocking and interlocking.

In operation, pressurized air from the plenum chamber issues through air slots in the form of pressurized air jets having a major flow component in the direction of conveyance engaging the bottle and preform neck. These direct air jets move the bottles and preforms in the conveying direction. The air jets thereafter pass through the gap between the neck guides and constitute a body of residual pressurized air having a residual flow component in the direction of conveyance which impinges on and enables movement of both preform and bottle in the conveying direction.

Figure 7:
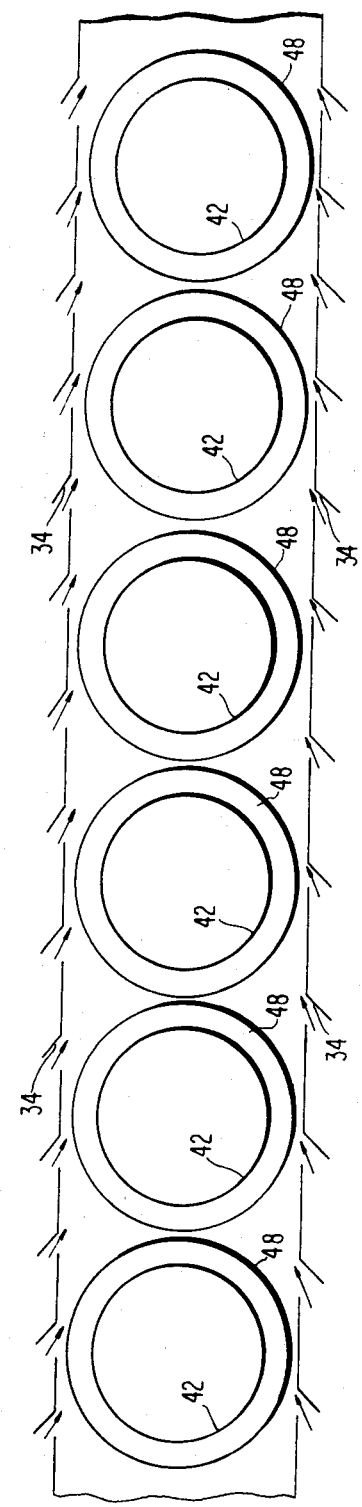
FIG. 7 is a schematic plan view showing an air conveyor according to the present invention for conveying bottle preforms.

In the course of conveying bottles and preforms an accumulation does occur when the bottles/preforms come to rest as shown in FIGS. 7 and 8. With preforms, a limited number of air slots (upstream of each preform) issue air jets to impinge directly on the preform necks. While this limited number of air jets is able to sustain movement of a preform, the collectivity of air jets upstream of each preform is not able to move the accumulation of preforms. As shown in FIG. 7, the air jets which normally move one preform are blocked by the next preform. Accumulation recovery of movement is enabled by the residual air stream passing through the neckring gap into the residual air channel and impinging on the body portion of preforms. The side curtains are effective to confine the residual air so that the residual air aids the directional air in moving the preforms. After so aiding movement, the residual air is exhausted from the air channel so that there is no buildup of back pressure within the air channel.

Similarly, the bottles accumulated at rest as shown in FIG. 8 require the upstream air jets as well as the residual air in the residual air channel to resume conveyance of the bottles.

Figure 6:
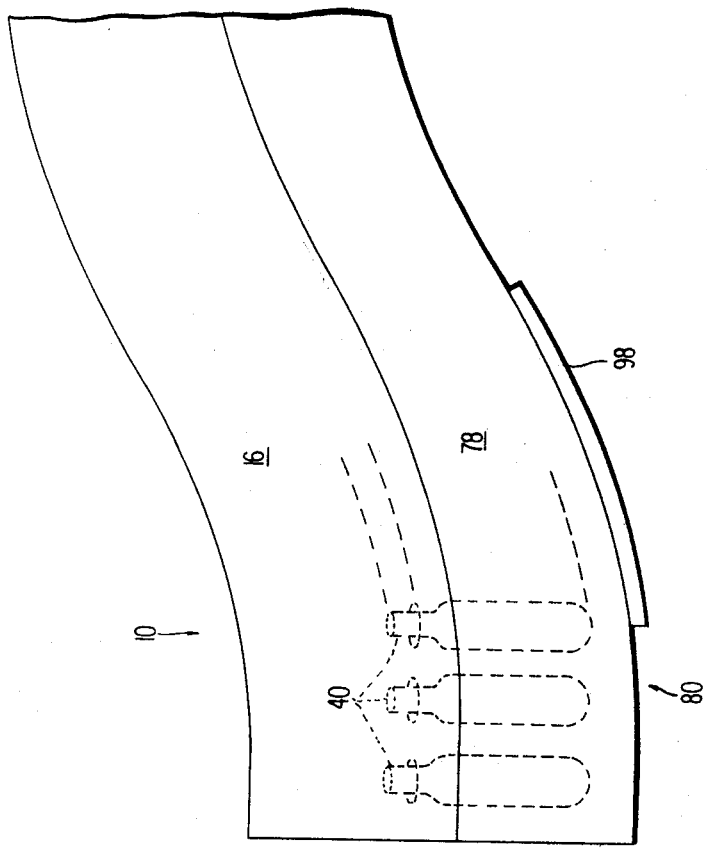
FIG. 6 is a side elevation view of an air conveyor according to the present invention in an inclined mode.

An air conveyor according to the present invention is able to convey bottles and preforms up an inclined conveyor section. As shown in FIG. 6, an air conveyor 10 is arranged for inclined conveyance. The air conveyor (including the embodiments described above for preforms and for bottles) is provided with a bottom plate 98 covering the exhaust gap 80 at the bottom of the side curtains 74, 74 and 76, 78 for a distance sufficient to redirect the residual air along the incline. That is to say, the bottom plate redirects the residual air which would otherwise leave the bottom gap 80 tangentally at the beginning of upward incline of the conveyor. The bottom plate preferably should extend from one-quarter to about two-thirds of the length of the incline. The bottom plate should be long enough to redirect the residual air in the direction of incline but in no event long enough to permit buildup of back pressure in the residual air channel. A build-up of back pressure in the residual air channel is undesireable in that it would interfere with conveyance of the bottles or preforms.

It is to be therefore understood that the present invention provides an air conveyor for moving bottles and bottle preforms in an upright manner by the bottle/preform necks being engaged by protective guide rails and by using air jets as the conveying medium so to preserve the bottles and bottle preforms against marring, scarring, or abrasion.

We claim:

1. An air conveyor for bottle members having a neck portion and a depending body portion comprising an elongated plenum chamber having an elongated bottom wall member joined to contiguous wall means for defining a plenum chamber for receiving pressurized air, means for supplying pressurized air to the plenum chamber, said bottom wall having an elongated slot therein, an elongated U-shaped channel member overlying said slot and defining a conveying path, a plurality of air slots in said channel member for admitting pressurized air jets into said channel from said plenum chamber, means for engaging and supporting each bottle member at its neck portion so that the neck of each bottle member is within said channel for receiving the propelling force of said jets whereby the bottles are conveyed along said path, a pair of confronting side curtains depending from opposite sides of the conveyor in close proximity to the body portion of said bottle members, and an opening defined by the bottom edge portions of the side curtains to exhaust air from said air conveyor.

2. An air conveyor as defined in claim 1 wherein the engaging and supporting means cooperates with a neck ring located intermediate the neck and body portions of the bottle.

3. An air coveyor as defined in claim 1 in which the U-shaped channel member has air slots incised therein on both sides of the bottle neck portion.

4. A air conveyor as defined in claim 1 in which the bottom edge portion of each side curtain is fitted with a guide surface for guiding the bottom portion of the bottles.

5. An air conveyor as defined in claim 1 in which a portion of its length lies in an incline between portions of the conveyor at different elevations and in which a bottom plate connects the bottom edge portion of the side curtains for a distance of from one-quarter to two-thirds of the length of the incline as an aid to conveying bottles up the incline.

* * * * *